United States Patent
Tho (10) Patent No.: US 8,724,297 B2
(45) Date of Patent: May 13, 2014

(54) MOBILE DISPLAY DEVICE AND WINDOW MANUFACTURING METHOD FOR THE DISPLAY DEVICE

(75) Inventor: Gihoon Tho, Seoul (KR)

(73) Assignee: LG Electronics Inc., Seoul (KR)

( * ) Notice: Subject to any disclaimer, the term of this patent is extended or adjusted under 35 U.S.C. 154(b) by 477 days.

(21) Appl. No.: 12/946,281

(22) Filed: Nov. 15, 2010

(65) Prior Publication Data

US 2011/0261513 A1   Oct. 27, 2011

(30) Foreign Application Priority Data

Apr. 22, 2010   (KR) .................. 10-2010-0037130

(51) Int. Cl.
*G06F 1/16* (2006.01)
*H05K 5/00* (2006.01)
*H05K 7/00* (2006.01)

(52) U.S. Cl.
USPC ............ 361/679.01; 361/679.02; 361/679.21; 361/679.26; 361/679.3

(58) Field of Classification Search
CPC ....... G06F 1/16; G06F 1/1601; G06F 1/1626; G06F 1/1637; H04M 1/0202; H04M 1/026; H04M 1/0266
USPC ............. 361/679.01, 679.02, 679.21, 679.26, 361/679.3, 679.55, 679.56; 379/433.04; 349/58; 455/575.1–575.9
See application file for complete search history.

(56) References Cited

U.S. PATENT DOCUMENTS

| | | | | |
|---|---|---|---|---|
| 5,479,285 | A * | 12/1995 | Burke | 349/58 |
| 6,084,962 | A * | 7/2000 | Plenge | 379/433.01 |
| 6,181,548 | B1 * | 1/2001 | Wheeler | 361/679.21 |
| 6,375,026 | B1 * | 4/2002 | Sheldrake et al. | 220/4.02 |
| 6,476,883 | B1 * | 11/2002 | Salimes et al. | 349/58 |
| 6,477,039 | B2 * | 11/2002 | Tajima | 361/679.21 |
| 7,072,699 | B2 * | 7/2006 | Eiden | 455/575.8 |
| 7,117,011 | B2 * | 10/2006 | Makino | 455/556.1 |
| 7,454,014 | B2 * | 11/2008 | Nuovo | 379/434 |
| 7,626,809 | B2 * | 12/2009 | Tai et al. | 361/679.21 |
| 7,864,516 | B2 * | 1/2011 | Lee et al. | 361/679.21 |
| 8,164,886 | B1 * | 4/2012 | Shelander et al. | 361/679.01 |
| 8,249,661 | B2 * | 8/2012 | Lee et al. | 455/566 |
| 8,259,930 | B2 * | 9/2012 | Kawasaki et al. | 379/433.04 |
| 8,427,820 | B2 * | 4/2013 | Kusuda et al. | 361/679.21 |
| 2006/0232972 | A1 | 10/2006 | Mochizuki | |
| 2007/0010303 | A1 | 1/2007 | Jalonen | |
| 2007/0247437 | A1 * | 10/2007 | Ku et al. | 345/173 |
| 2008/0074397 | A1 * | 3/2008 | Itoh et al. | 345/169 |
| 2010/0033818 | A1 | 2/2010 | Petcavich et al. | |
| 2011/0043720 | A1 * | 2/2011 | Okabe et al. | 349/58 |
| 2011/0098921 | A1 * | 4/2011 | Miller et al. | 701/207 |

OTHER PUBLICATIONS

European Search Report issued in EP Application No. 10015008.5 dated Jul. 7, 2011.

* cited by examiner

*Primary Examiner* — Anthony Haughton (74) *Attorney, Agent, or Firm* — KED & Associates, LLP (57) ABSTRACT

A mobile display device is provided. The mobile display device may include a body, a display arranged in the body, a window arranged on the display unit, and a protective member coupled to the window and extending beyond an outer periphery of the window so as to protect the window from an external impact or shock.

21 Claims, 7 Drawing Sheets

MOBILE DISPLAY DEVICE AND WINDOW MANUFACTURING METHOD FOR THE DISPLAY DEVICE

CROSS-REFERENCE TO RELATED APPLICATION(S)

Pursuant to 35 U.S.C. §119 (a), this application claims the benefit of an earlier filing date and right of priority to Korean Patent Application No. 10-2009-0037130, filed in Korea on Apr. 22, 2010, the contents of which is hereby incorporated by reference in its entirety.

BACKGROUND

1. Field

This relates to a mobile display device and associated manufacturing method.

2. Background

Generally, a display device may be capable of displaying information, inputting/outputting information, storing data, performing sound and image communication, and other such functions. The display device may include a case, a display arranged inside the case, and a window provided at a front surface of the case for viewing and protecting the display.

In some displays, the window may be formed so as to generate a 3D image. However, fabrication of such a window may be complicated, increasing manufacturing cost and decreasing productivity. Design of a sill between the case and the window in order to protect the window from direct impact if, for example, the display device is dropped or subjected to some other type of external impact, may further increase complexity and cost.

BRIEF DESCRIPTION OF THE DRAWINGS

Various embodiments will be described in detail with reference to the following drawings in which like reference numerals refer to like elements wherein:

FIG. 14 is a plan view of a window employing various protective members in;

DETAILED DESCRIPTION

Hereinafter, general terms, such as, for example, 'module', 'unit' and 'part' may be used to describe various elements, simply for ease of discussion. However, significant meanings or roles should not be applied to such terms, and it is understood that the terms 'module', 'unit' and 'part' may be used together or interchangeably.

The accompanying drawings illustrate general characteristics of methods, structure and/or materials utilized in certain exemplary embodiments, and supplement the written description provided below. These drawings are not necessarily to scale and may not precisely reflect the precise structural or performance characteristics of any given embodiment, and should not be interpreted as defining or limiting the range of values or properties encompassed by exemplary embodiments. For example, the relative thicknesses and positioning of molecules, layers, regions and/or structural elements may be reduced or exaggerated for clarity. The use of the same or similar reference numbers in the various drawings is intended to indicate the same or similar element or feature.

The meaning of specific terms or words used in the specification and claims is not necessarily limited to the literal or commonly employed sense, and may be construed or may be different based on the particular application. Therefore, the definition of the specific terms or words should be based on the associated context.

Hereinafter, the singular forms "a," "an" and "the" are intended to include the plural forms as well, unless the context clearly indicates otherwise. Furthermore, to the extent that the term "includes" is used in either the detailed description or the claims, such term is intended to be inclusive in a manner similar to the term "comprising" as "comprising" is interpreted when employed as a transitional word in a claim.

Figure 1:
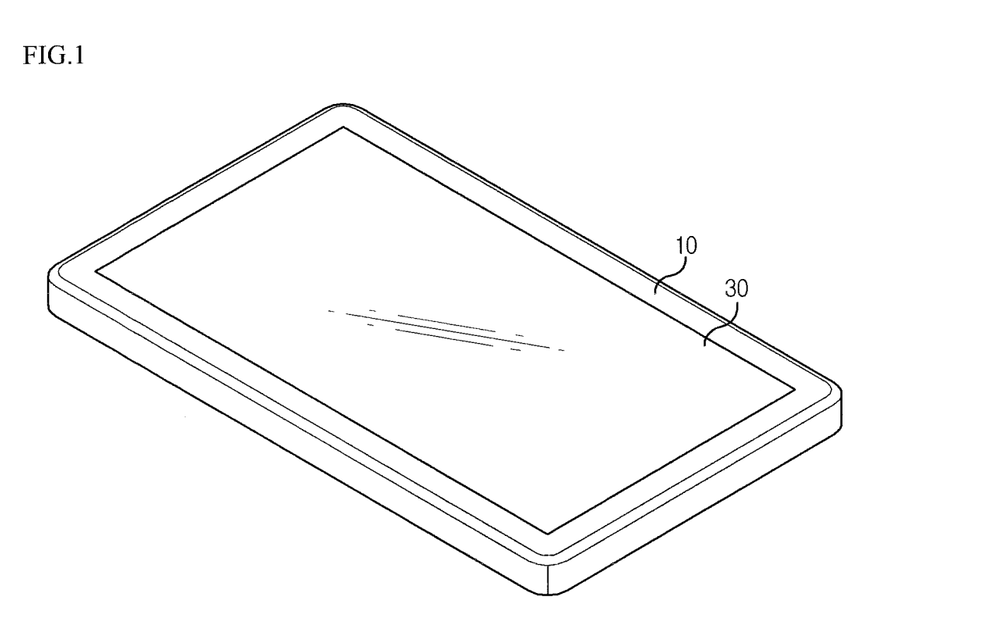
FIG. 1 is a perspective view of a mobile display device according to an exemplary embodiment as broadly described herein.

As shown in FIG. 1, a display device according to an exemplary embodiment as broadly described herein may include a body 10, a display 20 arranged inside the body 10, and a window 30 arranged on the display 20.

The display device may be applicable to any electronic device equipped with a display capable of displaying information. For example, lap top computers, mobile phones, smart phones, DTV, personal digital assistants (PDAs), portable multimedia players (PMP) and/or navigators may include such a display device.

The body 10 may be a case that forms an outer ring of the display device, and may have a single body structure or a structure comprising a plurality of bodies coupled in an openable and closeable manner. The body 10 may be applied to any type of mobile terminal including, for example, a folder type, a flip type, a swivel type, a swing type, a bar type, a watch type, a slide type, or other type of mobile terminal as appropriate. The body 10 may include an input device for inputting information and a battery for supplying electric power. The body 10 may also include a camera, a sound output module (a receiver, a speaker, a buzzer and the like), a communication module and a beam projection module.

The display 20 may be, for example, a liquid crystal display (LCD), a thin film transistor liquid crystal display (TFT LCD), an organic light-emitting diode (OLED), a flexible display, a 3-dimensional display, or other type of display as appropriate. The display 20 may display various types of visual information including, for example, text, numbers, symbols, graphics, icons, or other image information as appropriate.

The window 30 may be formed of transparent materials such as, for example, synthetic resin, glass or the like. The window 30 may have a variety of shapes, such as, for example, a flat type, a convex type on an upper surface that is exposed to an outside, a concave type on the upper surface, a curved type, an extended type having lateral surfaces at both sides, or other shape as appropriate.

In certain embodiments, the window 30 may be formed using a mold, so that the window may be manufactured in various shapes.

For example, if the window 30 is manufactured using a mold, shapes and sizes of holes (i.e., holes at a speaker and holes at a manipulating device) formed on the window 30 may be variably manufactured. The shapes of the window 30 may include multi-angled types, convex types, concave types, types having lateral surfaces and shapes having a sill. By manufacturing the window 30 using a mold, the window 30 may be freely designed, and thus the display device may be also designed in various shapes.

Figure 2:
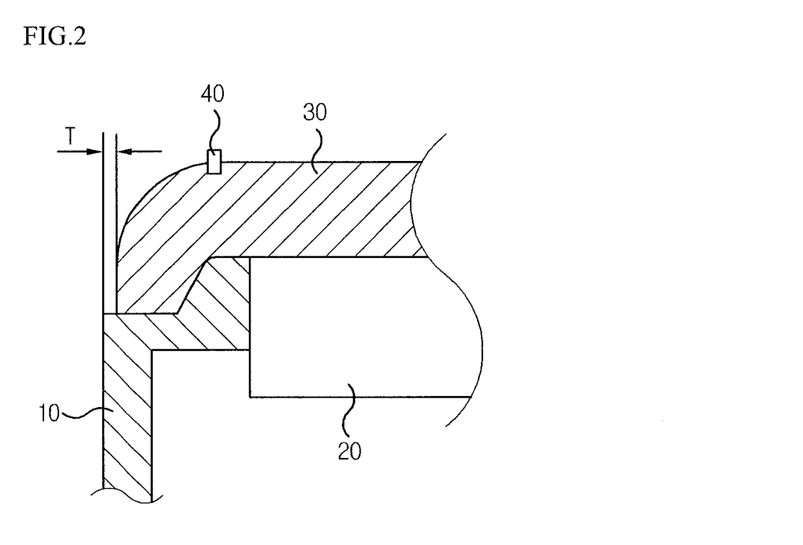
FIG. 2 is a partial cross-sectional view of the mobile display device shown in FIG. 1.

The window 30 may be integrally formed with a protective member 40 for protecting the window 30 from external impact or shock. That is, if the window 30 is formed using a mold, the protective member 40 may be integrally formed with the window 30 by, for example, insert injection molding. The protective member 40 may be formed of a material different from that of window 30, i.e., a material stronger than that of the window 30, so that the protective member 40 can withstand external shocks, and to protect the window 30 from direct contact in the event of an externally applied impact or shock, such as, for example, contacting the ground in the event the display device is dropped.

Figure 3:
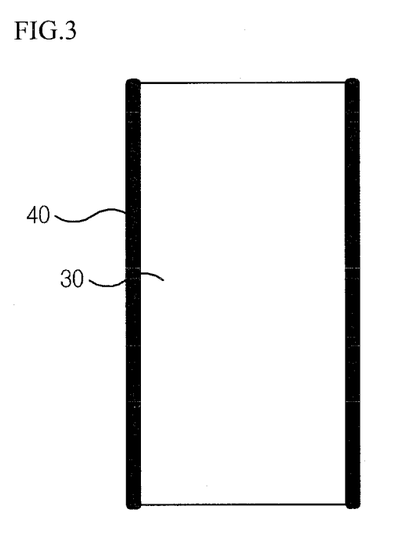
FIGS. 3 through 5 are plan views of an upper surface of a window including various exemplary embodiments of a protective member as broadly described herein.
Figure 4:
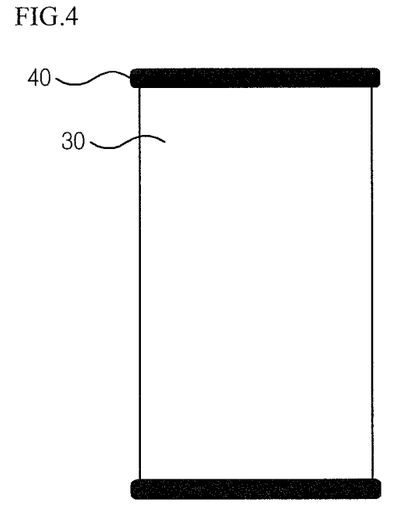
Figure 5:
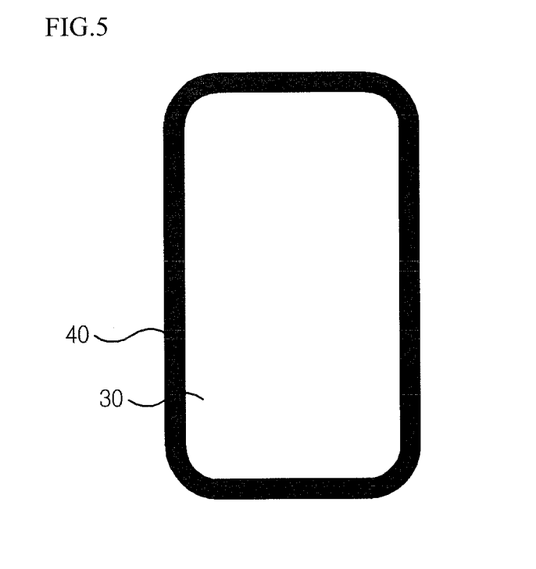

In certain embodiments, the protective member 40 may be mounted at a position where it may protect the window 30 against directly contacting the ground in the event the display device is dropped, without covering a screen of the display device. For example, the protective member 40 may be arranged on at least one of a plurality of margins, or peripheral edges, of the window 30. For example, as illustrated in the exemplary rectangular display device shown in FIG. 3, the protective member 40 may be arranged at two opposite horizontal margins of the window 30. As illustrated in FIG. 4, the protective member 40 may be arranged at two opposite vertical edges of the rectangular window 30. As illustrated in FIG. 5, the protective member 40 may be arranged along the entire peripheral edge of the window 30.

In certain embodiments, a portion of the protective member 40, such as, for example a bottom surface of the protective member 40 may be integrally formed with the window 30, and an upper surface of the protective member 40 may protrude out from an outer surface of the window 30 and upward, as shown in FIG. 2. A lateral surface of the body 10 may protrude outward by a gap (T) with respect to a lateral surface of the window 30, such that the lateral surface of the window 30 is protected from external shock.

The protective member 40 may also function as a decorative piece of the display device by being mounted at the window 30. For example, an existing decorative piece mounted on the body 10 may be removed and replaced by the protective member 40 to reduce manufacturing cost and improve the external appearance of the display device. The protective member 40 may be formed of a metal material such as, for example, steel, or may be formed of other types of materials as appropriate.

Figure 6:
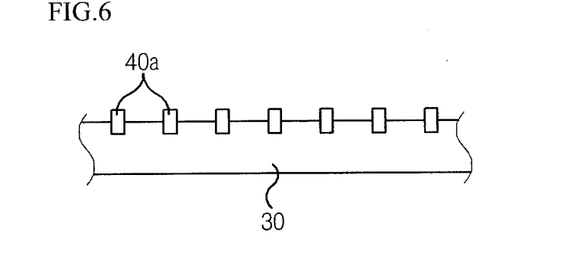
FIGS. 6 through 13 are cross-sectional views of protective members in accordance with various exemplary embodiments as broadly described herein.

For example, as illustrated in FIG. 6, a protective member 40a may have one or more bars arranged along a peripheral edge of the window 30 at predetermined intervals. The bars of the protective member 40a may take the shape of a rod or multi-angled bar, where a lower end of the rod is fixed at the window 30, and an upper end of the rod protrudes from an outer surface of the window 30.

Figure 7:
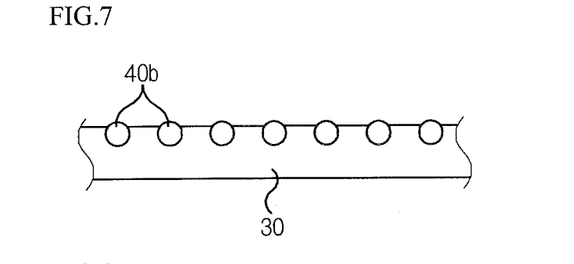

In another exemplary embodiment, a protective member 40b, as illustrated in FIG. 7, may include one or more balls, with a part of each ball protruding from an outer surface of the window 30, while other portions of the ball are embedded in the window 30. A plurality of balls may be arranged along a peripheral edge of the window 30 at predetermined intervals.

Figure 8:
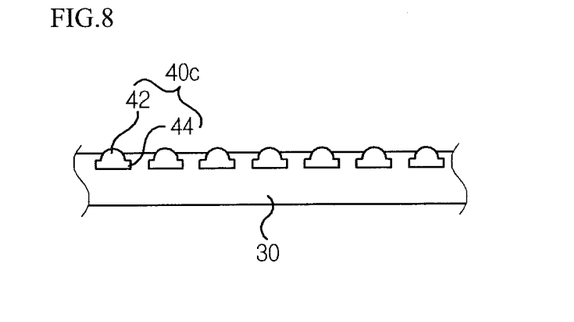

In still another exemplary embodiment, as illustrated in FIG. 8, a protective member 40c may include a one or more protrusions 42 each having a spherical, or semi-spherical shape, and protruding from an outer surface of the window 30, and a fixture 44 integrally formed with a lower surface of each protrusion 42 and having a plate shape that is embedded in the window 30.

Figure 9:
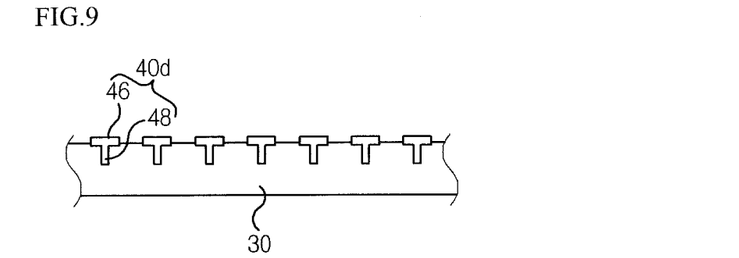

In still another exemplary embodiment, as illustrated in FIG. 9, a protective member 40d may include one or more 'T' shaped elements each including a vertical unit 48 that is vertically embedded in the window 30, and a horizontal unit 46 that is horizontally arranged on an upper surface of the vertical unit 48, and that protrudes from an outer surface of the window 30.

Figure 10:
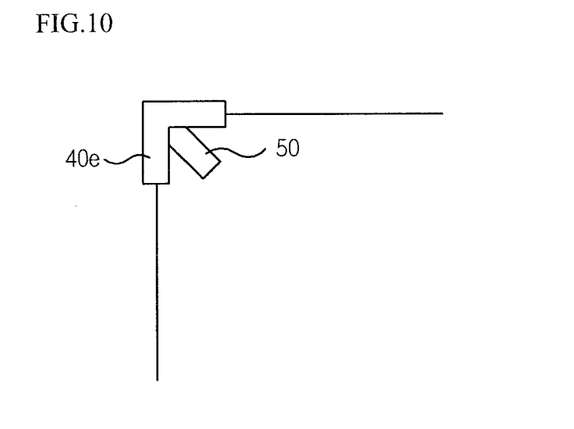

In still another exemplary embodiment, as illustrated in FIG. 10, a protective member 40e may form a right angle and be arranged at a corner of the window 30. A support rib 50 of the protective member 40e may extend into and be embedded in the window 30.

Figure 11:
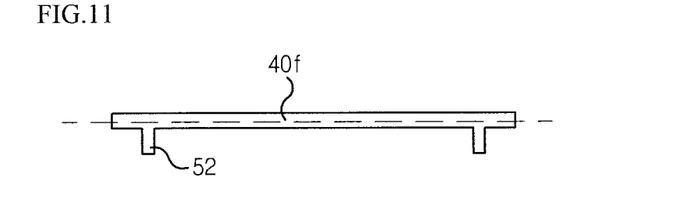

In still another exemplary embodiment, as illustrated in FIG. 11, a protective member 40f may have an elongated bar shape and be arranged at the peripheral edge of the window 30, with one longitudinal side of the bar inserted into the window 30, while the other side protrudes outward from the window 30. A reinforcing rib 52 may extend from the bar and be embedded in the window 30.

Figure 12:
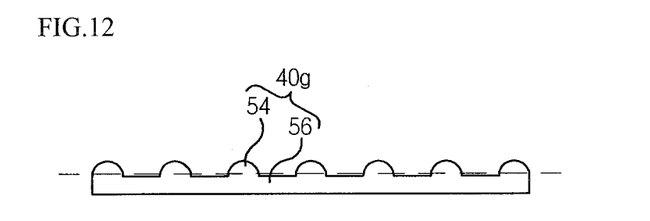

In still another exemplary embodiment, as illustrated in FIG. 12, a protective member 40g may include a bar 56 embedded in the window 30, and a series of spheres 54 that protrude from the bar 56 to an outer surface of the window 30, at predetermined intervals along the bar 56.

Figure 13:
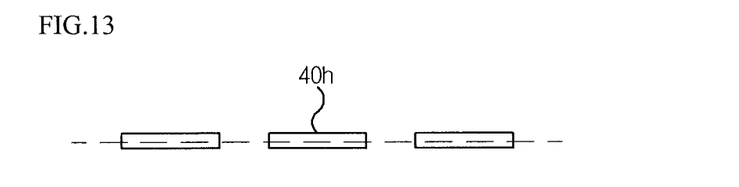

In still another exemplary embodiment, as illustrated in FIG. 13, a protective member 40h may include a series of bars arranged with a predetermined interval therebetween. One edge of each bar may protrude from an edge of the window 30 while the other edge of each bar is embedded into the window 30.

Figure 14:
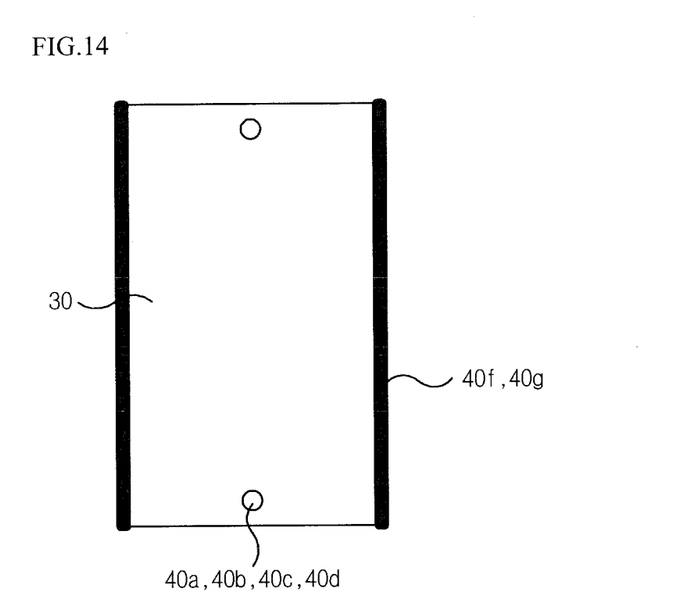

The protective member 40 thus configured may be applied to various shapes of display devices and combined in various ways. For example, as illustrated in FIG. 14, two opposite horizontal edges of the window 30 may be protected by any one of the protective members 40f or 40g shown in FIGS. 11 and 12, while two opposite vertical edges of the window 30 may be protected by any one of the protective members 40a, 40b, 40c or 40d illustrated in FIGS. 6, 7, 8 and 9. In addition, the window 30 may take a structure in which two, three or more protective members 40 are complexly arranged. Numerous arrangements and combinations of protective members 40 may be appropriate.

Figure 15:
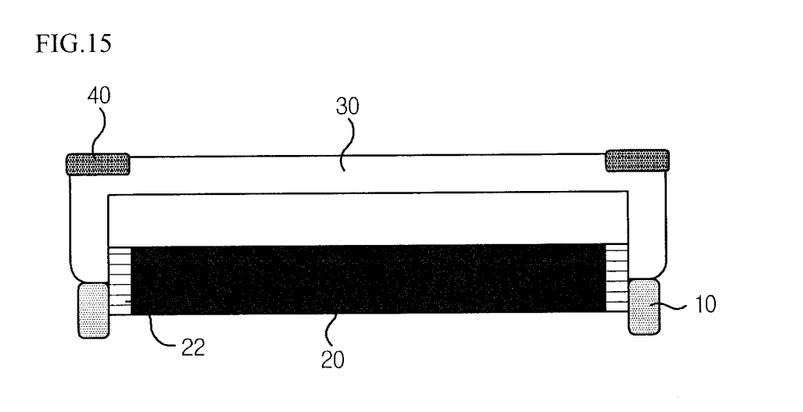
FIG. 15 is a cross-sectional view of a mobile display device according to another exemplary embodiment as broadly described herein.

In still another exemplary embodiment, as illustrated in FIG. 15, the protective member 40 may be arranged such that a black matrix 22 positioned at a peripheral edge of the display 20 is covered and the black matrix 22 is not visible from outside the display device. This may eliminate the need for a print layer for preventing the black matrix 22 from being visible from the outside.

Figure 16:
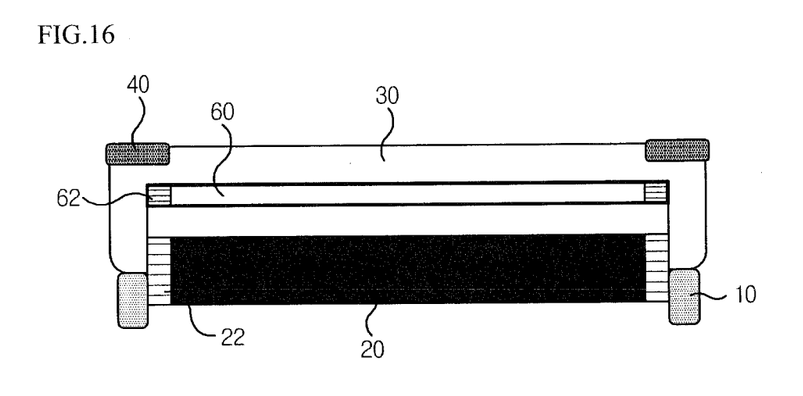
FIG. 16 is a cross-sectional view of a mobile display device according to still another exemplary embodiment as broadly described herein.

Furthermore, as shown in FIG. 16, a touch pad 60 for inputting information in a touch manner may be attached to a rear surface of the window 30. If the protective member 40 is mounted at a peripheral edge of the window 30, a silver pattern 62 arranged at an edge of the touch pad 60 and the black matrix 22 of the display 20 may be prevented from being exposed to the outside by the protective member 40.

A manufacturing process of a display device including a window as embodied and broadly described herein will now be described in detail.

Figure 17:
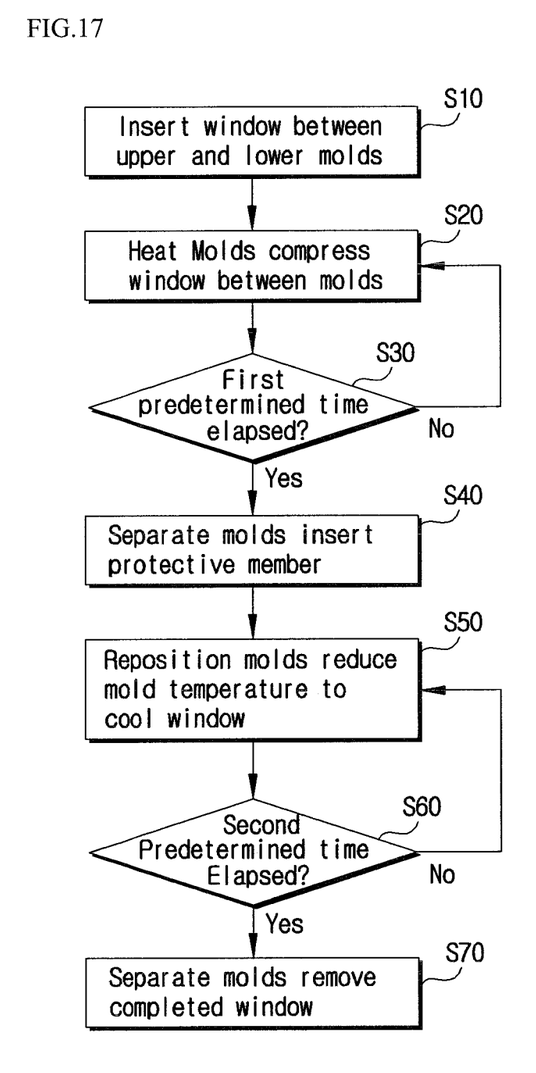
FIG. 17 is a flowchart of a method of manufacturing a mobile display device as embodied and broadly described herein.
Figure 18:
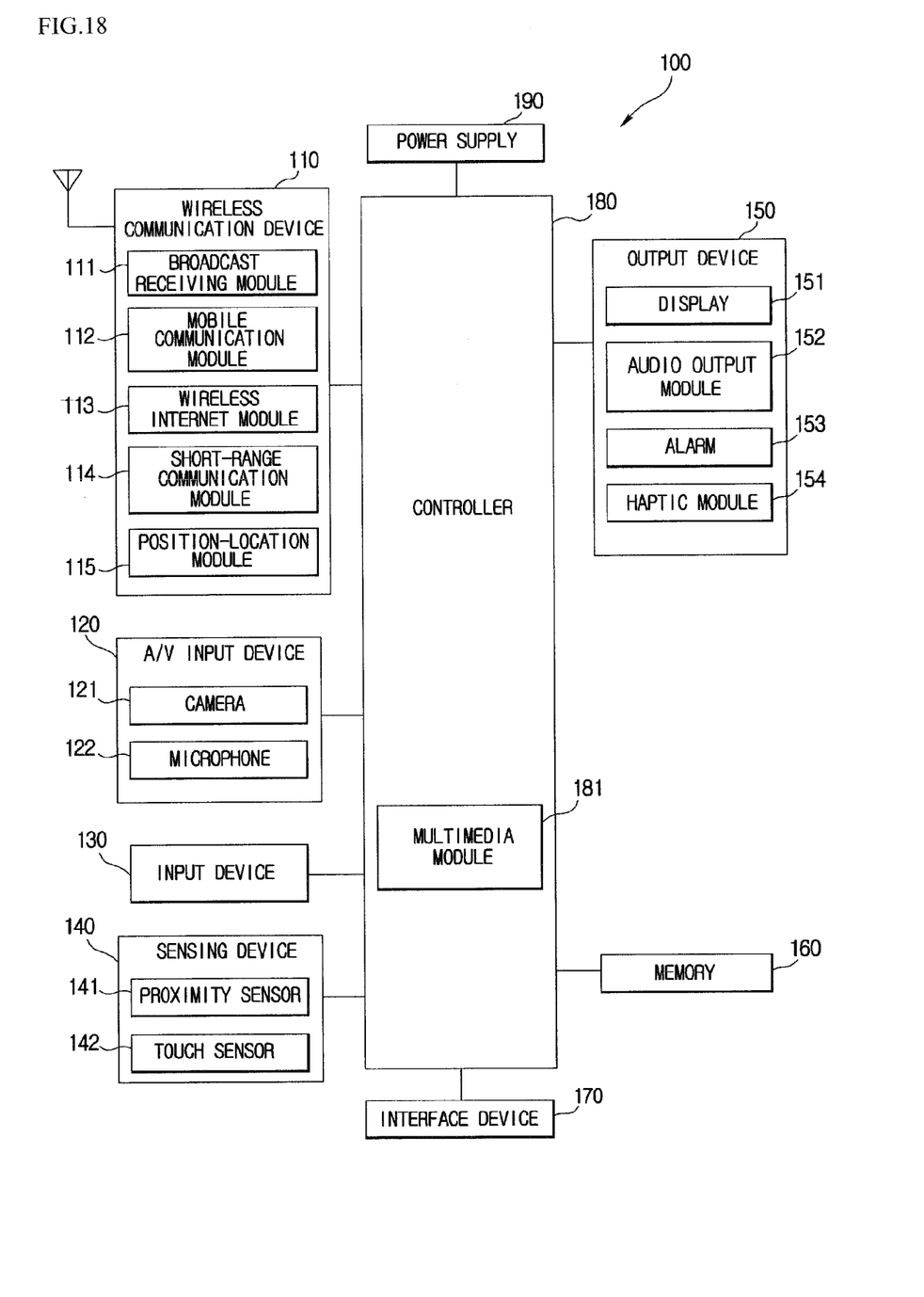
FIG. 18 is a block diagram of a mobile terminal in accordance with embodiments as broadly described herein.

First, a flat-type glass window may be inserted and arranged between an upper mold and a lower mold (S10), and a cavity between the upper mold and the lower mold is formed in substantially the same shape as that of a completed window. The flat-type molds may then be heated, and one of the molds may be slowly compressed so that the flat glass window is also heated and compressed (S20). In a predetermined time, the flat-type glass window is formed in a shape corresponding to that of the cavity and changed to a semi-solid state (S30).

After the window 30 is changed to a semi-solid state, the upper mold may be lifted and a protective member of, for example, a metal material, may be inserted into an edge of the window (S40). The protective member may be relatively easily inserted into the edge of the window, as, at this point, the window is in a semi-solid state, and an appropriate position of the protective member may be accurately fixed.

Thereafter, the upper mold may be lowered to fix the protective member in the window. For this purpose, in certain embodiments, an inner surface of the upper mold may have a groove formed therein corresponding to the protective member extending out of the edge of the window.

After the protective member is inserted in window, a temperature of the molds is slowly reduced to cool the window (S50). In a predetermined period of time, the molds are separated to produce a window integrally formed with a protective member (S60, S70).

In a mobile display device thus configured, a window may be integrally formed with a protective member by insert injection during window forming, so as to prevent an external shock from being directly applied to the window.

Furthermore, in a window formed using molds, the manufacturing process may be simplified to reduce manufacturing cost and to diversify designs of the window. Additionally, a protective member integrally formed with the window may also be decorative, and enhance an external appearance of the mobile terminal, while also dispensing with a separate member for decoration. The window thus described may be applied to numerous different types of mobile terminals.

FIG. 17 is a block diagram of an exemplary mobile terminal 100 having various different components, although other components may also be included. More or less components may alternatively be implemented. Other embodiments and arrangements may also be appropriate.

The mobile terminal 100 may include a wireless communication device 110, an audio/video (A/V) input device 120, an input device 130, a sensing device 140, an output device 150, a memory 160, an interface device 170, a controller 180 and a power supply 190.

The wireless communication device 110 may be configured with several components and/or modules, such as, for example, a broadcast receiving module 111, a mobile communication module 112, a wireless Internet module 113, a short-range communication module 114 and a position-location module 115. The wireless communication device 110 may include one or more components that permit wireless communication between the mobile terminal 100 and a wireless communication system or a network within which the mobile terminal 100 is located. In the case of non-mobile terminals, the wireless communication device 110 may be replaced with a wired communication device. The wireless communication device 110 and the wired communication device may be commonly referred to as a communication device.

The broadcast receiving module 111 may receive a broadcast signal and/or broadcast associated information from an external broadcast managing entity via a broadcast channel. The broadcast channel may include a satellite channel, a terrestrial channel, or other channel as appropriate. The broadcast managing entity may refer to a system that transmits a broadcast signal and/or broadcast associated information.

In certain embodiments, at least two broadcast receiving modules 111 may be provided in the mobile terminal 100 to provided for simultaneous reception of at least two broadcast channels, or to facilitate broadcast channel switching.

Broadcast associated information may include, for example, information associated with a broadcast channel, a broadcast program, a broadcast service provider, an electronic program guide (EPG) of digital multimedia broadcasting (DMB), an electronic service guide (ESG) of digital video broadcast-handheld (DVB-H), or other such information.

The broadcast signal may be, for example a TV broadcast signal, a radio broadcast signal, and/or a data broadcast signal. The broadcast signal may also include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored, for example, in the memory 160.

The mobile communication module 112 may communicate wireless signals with one or more network entities (e.g. a base station or Node-B). The signals may represent audio, video, multimedia, control signaling, data, and the like.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wired Internet module in non-mobile terminals. The wireless Internet module 113 and the wired Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth™ and ZigBee™.

The position-location module 115 may identify or otherwise obtain a location of the mobile terminal 100. The position-location module 115 may be provided using global positioning system (GPS) components that cooperate with associated satellites, network components, and/or combinations thereof.

Referring to FIG. 17, the audio/video (A/V) input device 120 may provide audio or video signal input to the mobile terminal 100. The A/V input device 120 may include a camera 121 and a microphone 122. The camera 121 may receive and process image frames of still pictures and/or video for display on the display 151.

The microphone 122 may receive an external audio signal while the mobile terminal 100 is in a particular mode, such as a phone call mode, a recording mode and/or a voice recognition mode. The received audio signal may then be processed and converted into digital data.

The mobile terminal 100, and in particular the A/V input device 120, may include a noise removing algorithm (or noise canceling algorithm) to remove noise generated in the course of receiving the external audio signal. Data generated by the A/V input device 120 may be stored in the memory 160, utilized by the output device 150, and/or transmitted via one or more modules of the wireless communication device 110. Two or more microphones 122 and/or cameras 121 may also be provided.

The input device 130 may generate input data in response to user manipulation of the input device 130 or devices. Examples of such devices may include a keypad, a dome switch, a touchpad (e.g., static pressure/capacitance), a jog wheel and/or a jog switch. A specific example may include one in which the user input device 130 is configured as a touchpad in cooperation with a display, as will be described below.

The sensing device 140 may provide status measurements of various aspects of the mobile terminal 100. For example, the sensing device 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

In an exemplary embodiment, the mobile terminal 100 may be configured as a slide-type mobile terminal. In such a configuration, the sensing device 140 may sense whether a sliding portion of the mobile terminal 100 is open or closed. The sensing device 140 may also sense the presence or absence of power provided by the power supply 190, presence or absence of a coupling or other connection between the interface device 170 and an external device and other such status determinations. In certain embodiments, the sensing device 140 may include a proximity sensor 141.

The output device 150 may generate an output relevant to a sight sense, an auditory sense, a tactile sense and the like. The output device 150 may include a display 151, an audio output module 152, an alarm 153, a haptic module 154 and other such modules associated with mobile terminal output.

The display 151 may display (output) information processed by the terminal 100. For example, if the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may be, for example, a liquid crystal display (LCD), a thin film transistor liquid crystal display (TFT LCD), an organic light-emitting diode (OLED), a flexible display, a 3-dimensional display, or other type of display device as appropriate.

The display 151 may have a transparent or light-transmissive type configuration to enable an external environment to be visible, referred to as a transparent display. A transparent OLED (TOLED) may be an example of a transparent display. A backside structure of the display 151 may also have a light-transmissive type configuration. In this configuration, a user may see an object located behind the terminal body through the area occupied by the display 151 of the terminal body.

In certain embodiments, at least two or more display devices 151 may be provided. For example, a plurality of displays 151 may be provided on a single face of the terminal 100, either arranged as a single body or spaced apart from each other on a single face of the terminal 100. Alternatively, each of a plurality of displays 151 may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor 142 may include a touch film, a touch sheet, a touchpad and the like.

The touch sensor 142 may convert a pressure applied to a specific portion of the display 151 or a variation of electrostatic capacity generated from a specific portion of the display 151 to an electric input signal. The touch sensor 142 may detect a pressure of a touch as well as a position and size of the touch.

If a touch input is provided to the touch sensor 142, signal (s) corresponding to the touch input may be transferred to a touch controller. The touch controller may process the signal (s) and then transfer corresponding data to the controller 180. The controller 180 may therefore know which portion of the display 151 is touched.

Referring to FIG. 17, a proximity sensor 141 may be provided at an inner area of a mobile terminal 100, wrapped by the touch screen or at a vicinity of the touch screen. The proximity sensor 141 is a sensor capable of detecting an object approaching a predetermined detection surface, or detecting whether there is an object nearby, using an electromagnetic force or an infrared signal, thus eliminating the need for mechanical or physical contact. The proximity sensor 141 may have a longer life than that of a contact sensor, thus providing higher utility.

Examples of such a proximity sensor 141 may include a transmissive photo sensor, direct reflective photo sensor, a mirror reflective photo sensor, a high frequency oscillating proximity sensor, a capacitive proximity sensor, a magnetic proximity sensor, an infrared proximity sensor and the like. In the case in which the touch screen is capacitive type, the proximity of a pointer may be detected by changes of electric fields caused by proximity of the pointer. The touch screen (touch sensor) therefore may be classified as a proximity sensor.

For ease of discussion, a case in which a pointer is recognized to be proximately placed on a touch screen without touching the touch screen is called a "proximity touch" and a case in which the pointer completely touches the touch screen is called a "contact touch". The position proximity-touched by the pointer on the touch screen is a position that corresponds vertically by the pointer to the touch screen when the pointer proximity-touches the touch screen.

The proximity sensor may detect the proximity touch and proximity touch pattern (e.g., proximity touch distance, proximity touch direction, proximity touch speed, proximity touch time, proximity touch position and proximity touch mobile state, etc.). Information corresponding to the detected proximity touch operation and proximity touch pattern may be displayed on the touch screen.

The audio output module 152 may output audio data that is received from the wireless communication device 110 in a call signal reception mode, a call mode, a recording mode, a voice recognition mode, a broadcast receiving mode and the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and the like.

The alarm 153 may output a signal for announcing an event occurrence of the mobile terminal 100. An event occurring in the mobile terminal 100 may include, for example, a call signal reception, a message reception, a key signal input, a touch input and other such events. The alarm 153 may output a signal for announcing an event occurrence by way of vibration, a video signal, an audio signal or a combination thereof. The video signal may be output via the display 151. The audio signal may be output via the audio output module 152. In certain embodiments, the display 151 or the audio output module 152 may be classified as part of the alarm 153.

The haptic module 154 may bring about various haptic effects that can be sensed by a user. Vibration is a representative example of a haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via an appropriate outlet, a suction power of air via an appropriate inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. In certain embodiments, two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and the like. The mobile terminal 100 may operate in association with a web storage that performs a storage function of the memory 160 via the Internet.

The interface device 170 may play a role as a passage to external devices connected to the mobile terminal 100. The interface device 170 may receive data from an external device. The interface device 170 may be supplied with power and then the power may be delivered to elements within the mobile terminal 100. The interface device 170 may enable data to be transferred to an external device from within the mobile terminal 100. The interface device 170 may include a wired/wireless headset port, an external charger port, a wired/wireless data port, a memory card port, a port for coupling to a device having an identity module, an audio input/output (I/O) port, a video input/output (I/O) port, an earphone port and other such access points.

The identity module may be a chip or card that stores various kinds of information for authenticating use of the mobile terminal 100. The identify module may include a user identity module (UIM), a subscriber identity module (SIM), a universal subscriber identity module (USIM) and the like. A device provided with the above identity module (hereafter an identity device) may be manufactured in the form of a smart card. The identity device may be connected to the mobile terminal 100 via the port.

In certain embodiments, the interface device 170 may play a role as a passage for supplying power to the mobile terminal 100 from a cradle that is connected to the mobile terminal 100. The interface device 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and the like. The controller 180 may include a multimedia module 181 for multimedia playback. The multimedia module 181 may be implemented within the controller 180 or may be configured separate from the controller 180.

The controller 180 may perform various other processes, including, for example, a pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of as broadly described herein may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

A mobile display device configured to integrate a window with a protective member is provided, thereby preventing the window from being directly applied with an outside shock.

A mobile display device configured to implement various designs on a case without recourse to mounting a device on a case for protecting a window due to integrated formation of the window with a protective member is provided.

A mobile display device configured to form a window by molding process is provided, thereby simplifying a manufacturing process, reducing a manufacturing cost and varying designs of the window.

A mobile display device configured to allow the protective member integrated with the window to function as an ornament is provided, thereby beautifying the design of the display device.

A mobile display device as embodied and broadly described herein may include a body; a display unit arranged inside the body; a window arranged on the display unit; and a protective member having a material different from that of the window, integrally formed with the window and protruded from an outer surface of the window.

In some exemplary embodiments, the window may take the shape of at least one of a flat type, a convex type on an upper surface, a concave type on the upper surface, a curved type, and an extended type of lateral surfaces to both sides.

In some exemplary embodiments, the window may be manufactured by using a mold.

In some exemplary embodiments, the protective member may be manufactured by using an insert injection molding.

In some exemplary embodiments, the protective member may be arranged on at least one of margins out of a plurality of margins on the window.

In some exemplary embodiments, the protective member may be arranged on at least one of both lengthwise margins of the window, both widthwise margins of the window and an entire margin of the window.

In some exemplary embodiments, the protective member may be formed with a metal material.

In some exemplary embodiments, the protective member may be formed of a plurality of rods, where a lower end of the rod is embedded in the window, and an upper end of the rods is protruded from an outer surface of the window.

In some exemplary embodiments, the protective member may take the shape of a ball, and a part of the ball is protruded from an outer surface of the window.

In some exemplary embodiments, the protective member may include: a protruder taking the shape of a sphere and protruding from an outer surface of the window; and a fixture taking the shape of a plate integrally formed with a lower surface of the protruder and embedded in the window.

In some exemplary embodiments, the protective member may include a vertical unit vertically arranged and embedded in the window, a horizontal unit horizontally arranged on an upper surface of the vertical unit and protruded from an outer surface of the window.

In some exemplary embodiments, the protective member may be folded at a right angle to wrap a corner of the window.

In some exemplary embodiments, the protective member may take the shape of a bar arranged at the margin of the window, where one side of the bar is protruded from an outer surface of the window, and the other surface of the bar is embedded in the window.

In some exemplary embodiments, the protective member may take the shape combined with at least two or more shapes out of a rod type, a bar type, a ball type, a sphere type and a type wrapping the corner.

In some exemplary embodiments, the protective member may be arranged with a black matrix at a place where a black matrix of the display unit is covered such that the black matrix is not shown from an outside.

In some exemplary embodiments, the protective member is arranged at a position where a silver pattern of a touch panel arranged at a lower surface of the window can be covered.

In some exemplary embodiments, the window may be formed with a glass material.

In some exemplary embodiments, the display device may include a mobile terminal.

In some exemplary embodiments, the mobile terminal may include a communication module transmitting and receiving information.

A window manufacturing method for a display device in accordance with an embodiment as broadly described herein may include arranging a flat window between an upper mold and a lower mold; heating and compressing the flat window; and inserting a protective member to the window if the flat window is changed to a semi-solid state.

In some exemplary embodiments, a groove having the same shape as that of a protrusion from an outer surface of the window at the protective member may be formed at any one inner surface of the upper mold and the lower mold.

In some exemplary embodiments, a hole forming unit may be formed on at least one of the upper mold and the lower mold in order to form a hole at the window.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile display device, comprising:
   a display configured to display information;
   a body coupled to a lateral side surface of the display and configured to form an external contour, the body defining an opening, the display being visible through the opening;
   a window configured to be mounted on an upper surface of the display and an upper surface of the body, at a position corresponding to the opening formed in the body, wherein the window extends across the upper surface of the display and defines an upper peripheral edge of the display device; and
   a protective member that protrudes outward from an upper surface of the window,
   wherein the window is a molded window and the protective member is an insert injection molded member.

2. The device of claim 1, wherein the window is one of a flat type window, a convex type window having a convex shape on an upper surface thereof, a concave type window having a concave shape on the upper surface thereof, a curved type window, or an extended type window having lateral side surfaces extending from opposite side edges thereof.

3. The device of claim 1, wherein the protective member is provided on at least one of a plurality of peripheral edges of the window.

4. The device of claim 3, wherein the protective member is provided on two opposite lengthwise peripheral edges of the window, or two opposite widthwise peripheral edges of the window, or an entire periphery of the window.

5. The device of claim 1, wherein the protective member is formed of a metal material.

6. The device of claim 1, wherein the protective member comprises a plurality of rods, where a lower end of each of the plurality of rods is embedded in the window, and an upper end of each of the plurality of rods protrudes from the outer surface of the window.

7. The device of claim 6, wherein the lower end of each of the plurality of rods is embedded in a peripheral edge of the window, and the upper end of each of the plurality of rods is positioned on and extends outward from the peripheral edge of the window.

8. The device of claim 1, wherein the protective member comprises at least one ball, and wherein a first portion of the at least one ball protrudes from the outer surface of the window.

9. The device of claim 8, wherein the at least one ball comprises a plurality of balls spaced apart by a predetermined interval, and wherein the first portion of each of the plurality of balls is embedded in a peripheral edge of the window, and a remaining portion of each of the plurality of balls protrudes from outward from the peripheral edge of the window.

10. The device of claim 1, wherein the protective member comprises:
   at least one protrusion that protrudes from the outer surface of the window; and
   at least one corresponding fixture integrally formed with a lower surface of the at least one protrusion and embedded in the window.

11. The device of claim 10, wherein the protrusion has a spherical or a semi-spherical shape and the fixture has a plate shape.

12. The device of claim 11, wherein the at least one protrusion comprises a plurality of protrusions spaced apart by a predetermined interval, and wherein the at least one corresponding fixture comprises a plurality of fixtures each embedded in a peripheral edge of the window such that each of the plurality of protrusions protrudes from outward from the peripheral edge of the window.

13. The device of claim 1, wherein the protective member comprises at least one T shaped member, each comprising:
   a vertical member positioned vertically with respect to the window and having at least a portion thereof embedded in the window; and
   a horizontal member that is arranged horizontally on an upper surface of the vertical member and that protrudes from the outer surface of the window.

14. The device of claim 1, wherein the protective member has a bend formed therein so as to wrap around a corresponding corner of the window.

15. The device of claim 1, wherein the protective member comprises at least one bar arranged at an edge of the window, wherein a first of two opposite longitudinal side edges of the at least one bar protrudes from the outer surface of the window, and a second of the two opposite longitudinal side edges of the at least one bar is embedded in the window.

16. The device of claim 1, wherein the protective member comprises at least two or more shapes including a rod shape, a bar shape, a ball shape, a spherical shape, or an angled shape that wraps around a corner of the window.

17. The device of claim 1, wherein the display includes a black matrix, and wherein the protective member is installed such that the black matrix is covered and is not visible from an outside of the mobile display device.

18. The device of claim 1, further comprising a touch panel arranged at an interior surface of the window, wherein the protective member is positioned such that a silver pattern of the touch panel is covered and is not visible from an outside of the mobile display device.

19. The device of claim 1, wherein the window is formed of a glass material.

20. The device of claim 1, wherein the display device comprises a mobile terminal.

21. The device of claim 1, wherein the mobile terminal includes communication module that transmits and receives information.

* * * * *